(12) United States Patent
Fujioka

(10) Patent No.: US 7,722,703 B2
(45) Date of Patent: May 25, 2010

(54) GAS ADSORPTION CONCENTRATION DEVICE, SEAL THEREFOR AND METHOD OF CONCENTRATING HIGH BOILING POINT VOCS USING DEVICE

(75) Inventor: Yuji Fujioka, Fukuoka (JP)

(73) Assignee: Seibu Giken Co., Ltd., Fukuoka (JP)

( * ) Notice: Subject to any disclaimer, the term of this patent is extended or adjusted under 35 U.S.C. 154(b) by 1078 days.

(21) Appl. No.: 11/086,561

(22) Filed: Mar. 23, 2005

(65) Prior Publication Data
US 2006/0042464 A1 Mar. 2, 2006

(30) Foreign Application Priority Data
Aug. 31, 2004 (JP) ............... 2004-251601

(51) Int. Cl.
*B01D 53/06* (2006.01)
*B01D 53/14* (2006.01)
*B01D 53/02* (2006.01)
*B01D 39/00* (2006.01)

(52) U.S. Cl. ............... 95/113; 95/86; 96/125; 96/130; 55/502

(58) Field of Classification Search ............... 95/113, 95/86; 96/125, 130; 55/502
See application file for complete search history.

(56) References Cited

U.S. PATENT DOCUMENTS

| | | | |
|---|---|---|---|
| 3,800,859 A | 4/1974 | Norback | |
| 3,907,310 A | 9/1975 | Dufour | |
| 4,897,221 A * | 1/1990 | Manchak, Jr. | ............... 588/2 |
| 5,162,636 A * | 11/1992 | Randolph et al. | ......... 219/445.1 |
| 5,572,799 A | 11/1996 | Masuyuki et al. | |
| 5,733,451 A | 3/1998 | Coellner et al. | |
| 5,989,702 A * | 11/1999 | Draper et al. | ............... 428/328 |
| 6,004,384 A | 12/1999 | Caudle | |
| 6,165,254 A | 12/2000 | Kawakami et al. | |
| 6,328,787 B1 * | 12/2001 | Yamauchi | ............... 95/113 |
| 6,527,837 B2 | 3/2003 | Kurosawa et al. | |
| 7,207,123 B2 | 4/2007 | Tanahashi et al. | |
| 2004/0020359 A1* | 2/2004 | Koermer et al. | ............... 95/113 |
| 2005/0235827 A1* | 10/2005 | Dinnage et al. | ............... 95/113 |
| 2006/0042464 A1 | 3/2006 | Fujioka | |

FOREIGN PATENT DOCUMENTS

JP 2001-276551 10/2001
JP 2004-130189 4/2004

OTHER PUBLICATIONS

U. S. Office Action for related U.S. Appl. No. 12/000,339; mailed Oct. 19, 2009.

* cited by examiner

*Primary Examiner*—Walter D Griffin
*Assistant Examiner*—Amber Orlando
(74) *Attorney, Agent, or Firm*—Staas & Halsey LLP

(57) ABSTRACT

The device has a honeycomb rotor which is rotated and which supports an adsorbant. A seal divides the honeycomb rotor into a desorption zone and at least one other zone including an adsorption zone. The seal has a heat resistant/non flammable portion and an elastic seal portion. The heat resistant portion has a slot cut in a surface which contacts the honeycomb rotor. The elastic seal portion is formed outside of the desorption zone with respect to the heat resistant portion. Desorption air is substantially completely sealed within the desorption zone. The seal may allow for hot (perhaps 300° C.) desorption gas to be used with a rotation type gas adsorption concentration device.

13 Claims, 4 Drawing Sheets

GAS ADSORPTION CONCENTRATION DEVICE, SEAL THEREFOR AND METHOD OF CONCENTRATING HIGH BOILING POINT VOCS USING DEVICE

CROSS-REFERENCE TO RELATED APPLICATIONS

This application claims the benefit of Japanese Application No. 2004-251601, filed Aug. 31, 2004, in the Japanese Patent Office, the disclosure of which is incorporated herein by reference.

BACKGROUND OF THE INVENTION

Rotation type gas adsorption concentration devices may be used to concentrate VOC's in air, which VOC's are emitted from plants such as semiconductor plants, painting factories and paper printing plants. In plants like these, solvents are used which contain VOC's. For example, the solvent may be paint or ink solvent. In order to burn and oxidize the VOC's, the VOC's need to be condensed, perhaps to a concentration at which self-combustion is possible. Rotation type gas adsorption concentration devices are becoming a popular way to concentrate the VOC's in plants such as these. These gas adsorption concentration devices may use a honeycomb rotor that supports an adsorbent. In this case, the rotor is divided into at least an adsorption zone and a desorption zone. The air to be processed, which contains VOC's, is passed through the adsorption zone, where the VOC's are adsorbed. In order to desorb the VOC's that were adsorbed by the honeycomb rotor, hot desorption air is passed through the desorption zone. There is a need for a rotation type gas adsorption concentration device that can withstand the hot air necessary to desorb the high boiling point VOC's.

SUMMARY OF THE INVENTION

Additional aspects and/or advantages of the invention will be set forth in part in the description which follows and, in part, will be obvious from the description, or may be learned by practice of the invention.

It has been proposed to separate the desorption zone of the honeycomb rotor using a nonflammable seal material, which is in contact with a surface of the rotor. The seal material may have a screw hole extending therethrough to attach the seal material. With the nonflammable seal material, it may be possible to pass desorption air, which has a temperature of approximately 300° C., through the desorption zone in order to desorb VOC's having a high boiling point. However, the demand for VOC removal is increasing. Further, the VOC's to be removed have a lower concentration, therefore requiring a better system to condense/concentrate the VOC's. A non-flammable seal material may reduce the leakage between zones of the honeycomb rotor. However, it is desired to have a tighter seal in which leaks are prevented more completely.

The inventor proposes a rotary gas adsorption device having a honeycomb rotor that supports an adsorbent. A seal divides the honeycomb rotor into at least an adsorbing zone and a desorbing zone. The seal has a heat resistant portion and may have an elastic portion. The heat resistant portion may has an abutting surface closely adjacent to the honeycomb rotor. The abutting surface may have a slot formed therein that divides the abutting surface into substantially parallel abutting surface portions.

If an elastic portion is used, both the heat resistant portion and the elastic portion at least partially surrounding the desorbing zone, and the elastic portion is formed exterior to the desorbing zone with respect to the heat resistant seal portion.

The heat resistant material may be formed of a mica-paper laminate in a polysilicon binder. The elastic portion may be formed of silicone rubber.

Angled cutout portion may be formed in the abutting surface of the heat resistant portion. The rotor rotates in a rotation direction, past the seal, and the cutout portions may face an upstream side relative to the rotation direction. The angled portions may run substantially parallel to the slot, with one of the two angled portions facing the slot.

The surface of the heat resistant portion closely adjacent to the honeycomb rotor may be spring biased toward the honeycomb rotor.

The desorbing zone may be pie-shaped. To separate the desorbing zone from a remainder of the honeycomb rotor, the seal may include two side portions and a top curved portion.

To remove and concentrating high boiling point volatile organic compounds, the high boiling point volatile organic compounds are sent through the adsorbing zone of the honeycomb rotor, and a desorbing gas is passed through the desorbing zone of the honeycomb rotor.

The heat resistant portion may be fastened to a biasing support with a fastener that extends from the slot through a screw hole in the heat resistant portion.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

The inventor proposes a simple device to prevent the leakage of hot (perhaps 300° C.) desorption air. This device may be used on a rotation type gas adsorption concentration device to prevent the leakage of the hot desorption air.

Figure 1:
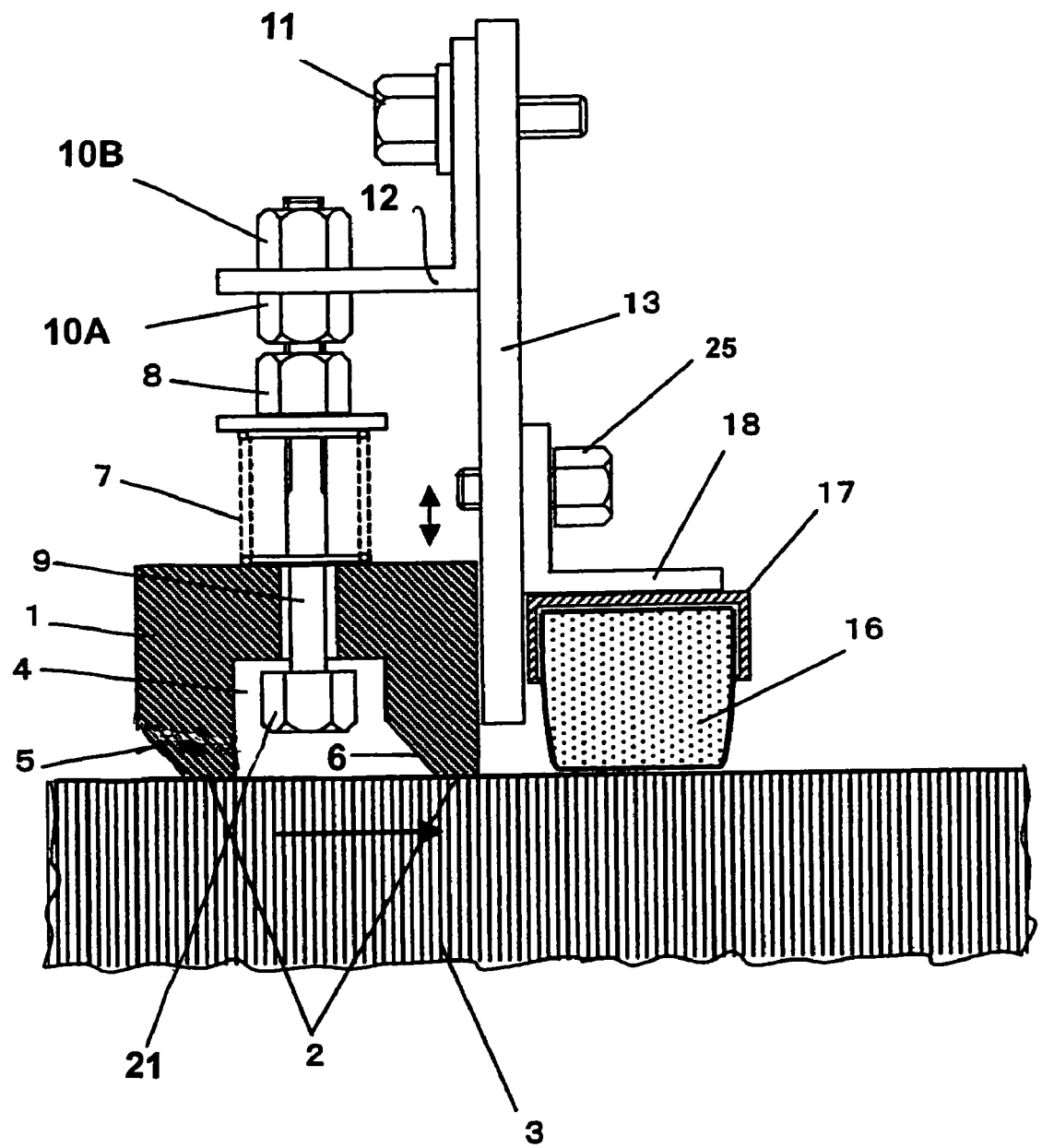
FIG. 1 is a sectional view showing a seal for a rotation type gas adsorption concentration device according to one embodiment of the invention.

FIG. 1 is a cross-sectional view of a seal for a rotation type gas adsorption concentration device. FIG. 1 shows the seal materials and the mounting thereof. The seal is formed from a heat resistant portion 1 and an elastic portion 16. One material that may be used for the heat resistant seal material 1 is mica-paper. Mica-paper is formed from small pieces of mica that are bound together with a binder such as silicone resin.

The heat resistant seal material 1 has a slot 4 in the bottom surface 2, which contacts an end face of a honeycomb rotor 3. The slot 4 divides the bottom surface 2 into two surface portions, which may be substantially parallel. Cutout portions 5 and 6 are formed in corners of the surface portions, between the bottom and side surfaces of the heat resistant seal material 1. These cutout portions 5 and 6 are formed in the upstream side relative to the direction of movement (the direction of the arrow) of the honeycomb rotor 3.

According to one embodiment, a spring 7 forces the heat resistant seal material 1 toward the upper surface of the honeycomb rotor 3. The forcing pressure can be adjusted with a nut 8, which is screwed on a bolt 9. The bolt 9 has a head located in the slot 4 such that the bolt 9 penetrates the heat resistant seal material 1. The bolt 9 is fixed to an L shaped metal fitting 12 with a pair of nuts 10A and 10B. The L shaped metal fitting 12 is attached to a casing 13 with a bolt 11. Although the spring 7 biases the heat resistant seal material 1 toward the honeycomb rotor, when a sufficiently strong force is received, the heat resistant seal material 1 will move upwards, toward the L shaped metal fitting 12 and away from the honeycomb rotor 3.

According to another embodiment, the heat resistant seal material 1 is not biased towards the upper surface of the honeycomb rotor 3. In this case, the spring 7 is not provided. Instead, the heat resistant seal material 1 is fixed to the casing 13. There are numerous ways this can be accomplished. For example, the spring 7 could be eliminated and the heat resistant seal material 1 could be sandwiched between nut 21 and nut 8. Alternatively, the L shaped metal fitting 12 could be lowered and nut 10A, nut 8 and spring 7 could be eliminated. In this case, the heat resistant seal material 1 is sandwiched between the L shaped metal fitting 12 and nut 21. If the heat resistant seal material 1 is not spring biased towards the upper surface of the honeycomb rotor 3, it is positioned a short distance from the honeycomb rotor 3. For example, the heat resistant seal material 1 may be positioned 1 to 2 mm from the upper surface of the honeycomb rotor 3.

With reference to FIG. 1, the seal is formed not only from the heat resistant seal material 1, but also from an elastic seal material 16. For example, the elastic seal material 16 may be formed of silicone rubber. The elastic seal material 16 is mounted in a seal frame 17, which may be formed of stainless steel. The seal frame 17 is connected to the casing 13 through an L shaped metal fitting 18, which is attached to the casing 13 with a bolt 25. A lower end of the elastic seal material 16 is in contact with an upper surface of the honeycomb rotor 3.

Figure 2:
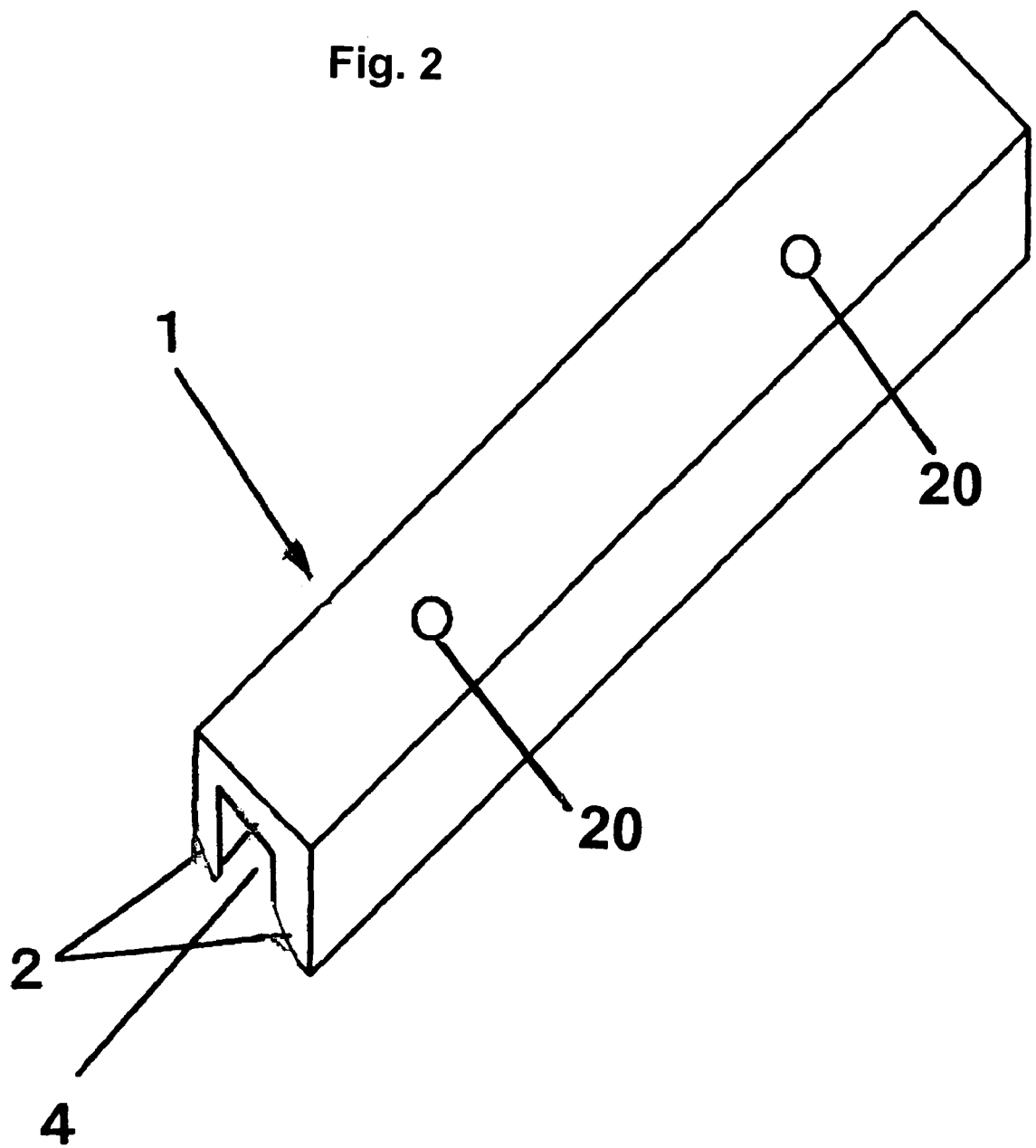
FIG. 2 is a perspective top view showing one embodiment of a heat resistant seal material, which can be used with the device shown in FIG. 1.

FIG. 2 is a top perspective view of the heat resistant seal material shown in FIG. 1. As can be seen, the seal material 1 is long and slender. Holes 20 receive bolts 9 to fasten the seal material 1 to the casing 13.

Figure 3:
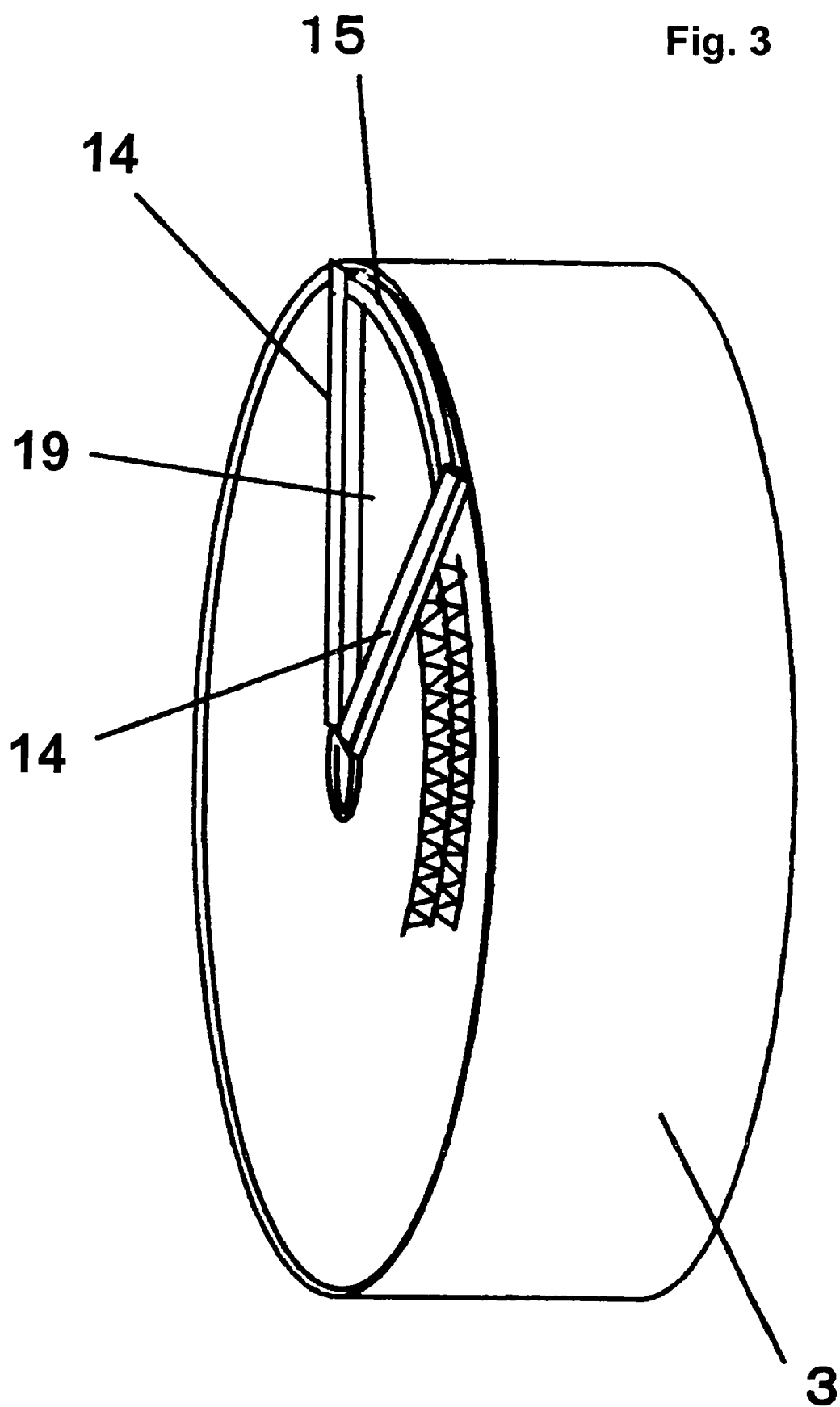
FIG. 3 is a perspective view of a rotation type gas adsorption device.
Figure 4:
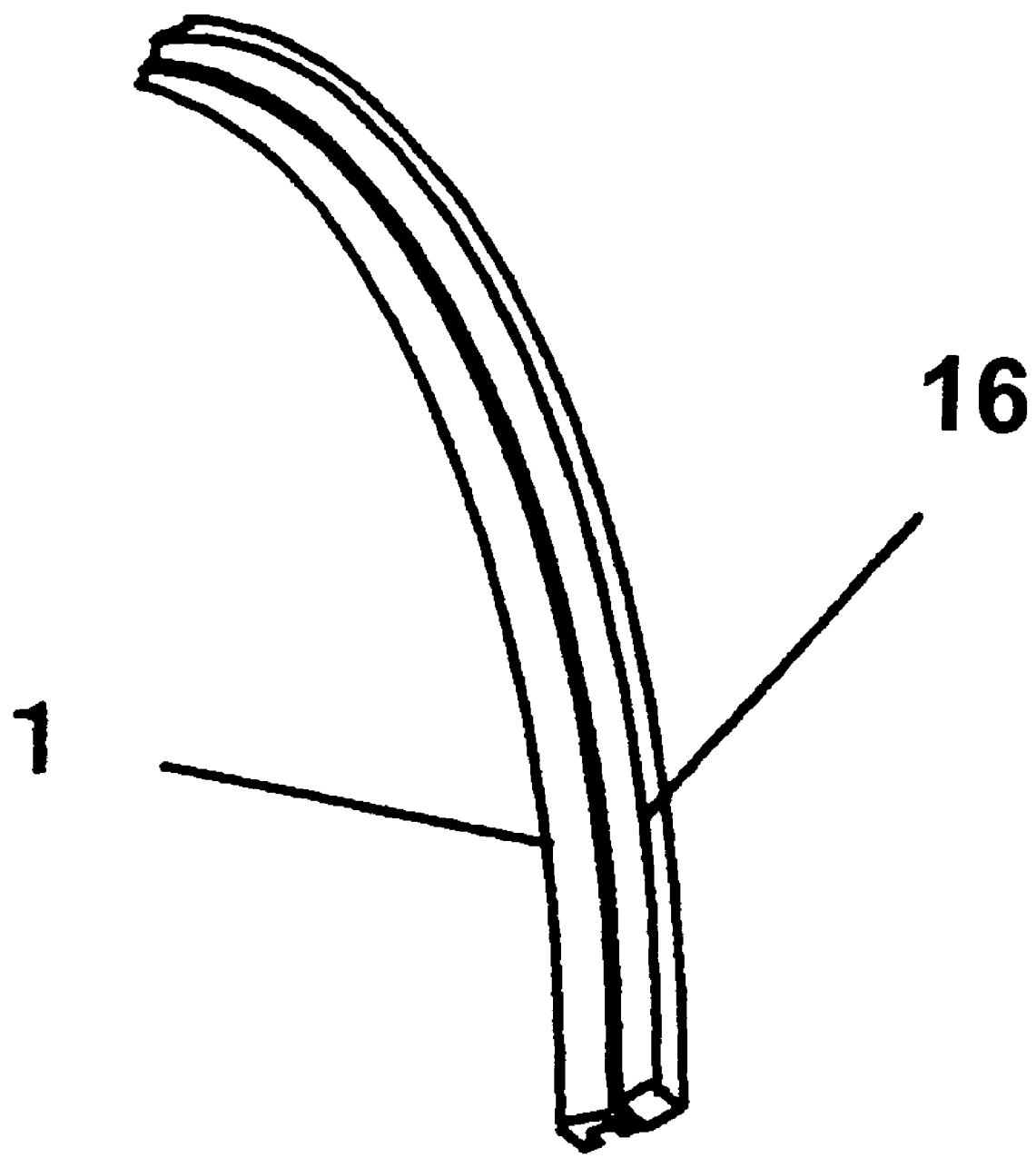
FIG. 4 is a perspective view showing one embodiment of an arched seal portion for a rotation type gas adsorption concentration device.

FIG. 3 is a perspective view of a honeycomb rotor of a rotation type gas adsorption concentration device. An overall seal is formed from long slender side portions 14 and a top arched portion 15. The long slender side portions 14 are shown in FIG. 2. The arched top portion is shown in FIG. 4. Together, these seal portions 14, 15 enclose a desorption zone 19 of the honeycomb rotor.

The elastic seal material 16 is parallel to the heat resistant seal material 1 and is located outside of the desorption zone 19. That is, referring to FIG. 3, the heat resistant seal material 1 would face the desorption zone 19, where the temperature is greater. The elastic seal material 16 is located toward the outside of the pie shaped piece defining the desorption zone 19.

FIG. 4 is a top perspective view of the arched top portion of the seal. Whereas FIG. 2 shows only the heat resistant seal material 1, FIG. 4 shows both the heat resistant seal material 1 and the elastic seal material 16.

The operation of the rotation type gas adsorption device will now be described. Process air is sent to an adsorbing zone of the honeycomb rotor 3. Although different configurations are possible, the adsorbing zone is outside of the desorption zone 19 shown in FIG. 3. The air to be processed is sent through the honeycomb rotor as the honeycomb rotor is rotating. An adsorbent within the honeycomb rotor adsorbs volatile organic compounds (VOC's) contained in the process air. To desorb the VOC's, a heated gas, perhaps air heated to 180° C., is sent through the desorption zone so that the VOC's are desorbed from the adsorbent. The quantity of desorption gas required for the desorption zone is significantly less than the quantity of process air. For example, perhaps the quantity of desorption air is one-tenth the quantity of process air. In this case, the VOC's are concentrated to 10 times the original concentration in the process air.

The desorption gas/air passes through the desorption zone. Since the heat resistant seal material 1 is in contact with the end face of the honeycomb rotor 3, there is very little leakage of the desorption air from the desorption zone 19. Because a slot 4 is formed on the bottom surface of the heat resistant seal material 1, the desorption air must flow through a labrynth and pass both legs defined by the slot 4.

In addition, because the elastic seal material 16 is provided outside of the heat resistant seal material 1, even if gas from the desorption zone 19 leaks between the heat resistant seal material 1 and the end face of the honeycomb rotor 3, the leak is stopped by the elastic seal material 16.

The elastic seal material 16 is made of a material, such as silicone, rubber. As compared with the heat resistant seal material 1, the heat resistance of the elastic seal material 16 is low. However, since only a small amount of gas leaks from the heat resistant seal material 1 to the elastic seal material 16, only a small amount of heat is conveyed to the elastic seal material. The quantity of heat is small enough that the elastic seal material 16 is not negatively influenced.

If the heat resistant seal material 1 is not spring biased toward the upper surface of the honeycomb rotor 3, there may be a small gap between the honeycomb rotor 3 and the heat resistant seal material 1. Although hot air could leak through this gap, the amount of hot air leakage would not be sufficient to damage the elastic seal material 16.

The slot 4 in the heat resistant seal material 1 creates an air pocket in the heat resistant seal material 1, and effectively reduces the thickness of the heat resistant seal material 1. That is, instead of the heat resistant seal material being a thick block, the slot 4 forms the heat resistant seal material into a C-shape having two ends piece and a middle piece. Each piece taken alone is thinner than the block. The slot 4 also increases the distance through which heat must travel to be conducted from one side of the heat resistant seal to the other. That is, heat must now travel through the C-shape. Because of the small quantity of desorption air that leaks through the heat resistant seal material 1, and because the slot 4 reduces the thermal conductivity of the heat resistant seal material 1, there is very little heating of the air within the adsorption zone. Such heating is undesirable because it can reduce the effectiveness of the adsorbent.

In addition to rotating, it is possible for the end face of the honeycomb rotor to move up and down (see FIG. 1) with respect to the seal. For example, perhaps the axis of rotation could tilt slightly. The seal, and in particular the heat resistant seal material 1, is able to accommodate movement in the surface of the honeycomb rotor 3. Referring to FIG. 1, if the heat resistant seal material 1 is spring biased toward the honeycomb rotor 3, then the heat resistant seal material 1 moves up and down, sliding on the bolt 9. The heat resistant seal material 1 slides against the biasing force of spring 7. This biasing force can be adjusted using the nut 8, which is screwed on the bolt 9. If the heat resistant seal material 1 is fixed to the casing 13 (not spring biased), then there is a gap between the heat resistant seal material 1 and the honeycomb rotor 3. This gap is sufficient to tolerate movement of the honeycomb rotor 3.

The cutout portions 5 and 6 are formed in the contact surface of the heat resistant seal material 1. The cutout portions 5 and 6 are slanted at an angle to correspond with the direction of rotation of the honeycomb rotor 3. The cutout portions 5 and 6 prevent exfoliation of mica paper, which is used to form the heat resistant seal material 1.

When process air to be purified contains VOCs having a high boiling point, the use of a 180° C. desorptoin air may be not be sufficiently hot to fully desorb the VOC's from the honeycomb rotor 3. Instead, the VOC's would gradually accumulate. High boiling point VOC's having a boiling point of at least 200° C., more particularly, at least 250° C., and still more particularly, at least 280° C.

After the VOC's having a high boiling point have accumulated sufficiently on the honeycomb rotor 3, they can be desorbed using an extra hot desorption gas. For example, air heated to a temperature of at least 250° C., more particularly, at least 275° C., and still more particularly, at least 300° C. may be used as the desorption gas. This desorption gas desorbs substantially all VOC's and reactivates the adsorbent in the honeycomb rotor.

Because the heat resistant seal material 1 shows such high insulation effects, there are no difficulties caused by using such a high temperature desorption air in the desorption zone 19. The resistant seal material 1 may be made of a mica paper and use silicone as a binder. In this case, the heat resistant seal material will not degrade, even at temperatures as high as 550° C.

If hot desorption air leaks past the heat resistant seal material 1 while concentrating the VOC's, the efficiency at which VOC's are removed will fall. However, the elastic seal material 16 prevents even small quantities of gas from passing the combined seal material. If hot desorption air leaks past the heat resistant seal material 1, it will be stopped by the elastic seal material 16. Because only a small amount of desorption gas can pass the heat resistant seal material 1, the elastic seal material 16 does not suffer from heat degradation problems.

Even if there is a low concentration of VOC's and the VOC's are high boiling point substances, the rotation type gas adsorption concentration device allows the VOC's to be removed and concentrated.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

What is claimed is:

1. A seal to divide a honeycomb rotor supporting an adsorbent into at least an adsorbing zone and a desorbing zone, the seal comprising:
   a heat resistant portion positioned a predetermined distance from an upper surface of the honeycomb rotor to define a small gap therebetween; and
   an elastic portion contacting the honeycomb rotor and formed exterior to the desorbing zone with respect to the heat resistant seal portion to prevent desorption gas having passed through the gap from leaking beyond the seal,
   wherein the heat resistant portion and the elastic portion at least partially surround the desorbing zone.

2. A rotary gas adsorption device, comprising:
   the honeycomb rotor that supports the adsorbent; and
   the seal claimed in claim 1.

3. The rotary gas adsorption device according to claim 2, wherein the seal extends parallel to all borders of the desorption zone, to substantially surround the desorption zone.

4. The rotary gas adsorption device according to claim 2, wherein the heat resistant material is formed of a mica-paper laminate.

5. The rotary gas adsorption device according to claim 2, wherein the heat resistant material is formed of a mica-paper laminate in a polysilicone binder.

6. The rotary gas adsorption device according to claim 2, wherein the elastic portion is formed of silicone rubber.

7. The rotary gas adsorption device according to claim 2, wherein
   the heat resistant portion has a surface closely adjacent to the honeycomb rotor, and
   the surface of the heat resistant portion closely adjacent to the honeycomb rotor has angled cutout portions.

8. The rotary gas adsorption device according to claim 7, wherein
   the rotor rotates in a rotation direction, past the seal, and
   the cutout portions face an upstream side relative to the rotation direction.

9. The rotary gas adsorption device according to claim 2, wherein
   the heat resistant portion has a surface closely adjacent to the honeycomb rotor, and
   the surface of the heat resistant portion closely adjacent to the honeycomb rotor is spring biased toward the honeycomb rotor.

10. The rotary gas adsorption device according to claim 2, wherein
    the desorbing zone is pie-shaped, and
    to separate the desorbing zone from a remainder of the honeycomb rotor, the seal comprises two side portions and a top curved portion.

11. A method of removing and concentrating high boiling point volatile organic compounds, comprising:
    passing high boiling point volatile organic compounds through the adsorbing zone of the honeycomb rotor claimed in claim 2; and
    passing a desorbing gas through the desorbing zone of the honeycomb rotor.

12. A method of removing and concentrating high boiling point volatile organic compounds according to claim 11, wherein the high boiling point volatile organic compounds have a boiling point of at least 250 degrees C.

13. A method of removing and concentrating high boiling point volatile organic compounds according to claim 11, wherein the desorbing gas is air heated to a temperature of at least 300 degrees C.

* * * * *